(12) United States Patent
Lee

(10) Patent No.: US 9,650,043 B2
(45) Date of Patent: May 16, 2017

(54) REAL-TIME ANTICIPATORY SPEED CONTROL

(71) Applicant: GM Global Technology Operations LLC, Detroit, MI (US)

(72) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 14/700,426

(22) Filed: Apr. 30, 2015

(65) Prior Publication Data

US 2016/0318513 A1  Nov. 3, 2016

(51) Int. Cl.
| | |
|---|---|
| *B60T 8/32* | (2006.01) |
| *G05D 1/00* | (2006.01) |
| *G06F 7/00* | (2006.01) |
| *G06F 17/00* | (2006.01) |
| *B60W 30/14* | (2006.01) |
| *G01S 19/13* | (2010.01) |
| *B60W 40/109* | (2012.01) |
| *B60W 50/14* | (2012.01) |
| *B60W 10/20* | (2006.01) |
| *B60W 30/095* | (2012.01) |
| *B60W 40/072* | (2012.01) |
| *G06K 9/00* | (2006.01) |
| *G06K 9/62* | (2006.01) |

(52) U.S. Cl.
CPC ......... *B60W 30/143* (2013.01); *B60W 10/20* (2013.01); *B60W 30/0956* (2013.01); *B60W 40/072* (2013.01); *B60W 40/109* (2013.01); *B60W 50/14* (2013.01); *G01S 19/13* (2013.01); *G06K 9/00791* (2013.01); *G06K 9/6288* (2013.01); *B60W 2540/18* (2013.01); *B60W 2550/10* (2013.01); *B60W 2550/146* (2013.01); *B60W 2550/402* (2013.01); *B60W 2720/10* (2013.01); *B60W 2720/12* (2013.01)

(58) Field of Classification Search
USPC ........................................... 701/93, 36
See application file for complete search history.

(56) References Cited

U.S. PATENT DOCUMENTS

| | | | |
|---|---|---|---|
| 7,124,027 B1 * | 10/2006 | Ernst, Jr. ............... | B60W 30/09 340/435 |
| 7,400,963 B2 | 7/2008 | Lee et al. | |
| 2003/0093209 A1 | 5/2003 | Andersson et al. | |
| 2003/0204299 A1 | 10/2003 | Waldis et al. | |
| 2007/0078584 A1 | 4/2007 | Nakamura et al. | |

(Continued)

FOREIGN PATENT DOCUMENTS

| | | |
|---|---|---|
| DE | 102 58 167 A1 | 12/2002 |
| EP | 1577146 A2 | 9/2005 |

(Continued)

*Primary Examiner* — Ronnie Mancho
(74) *Attorney, Agent, or Firm* — Quinn IP Law

(57) ABSTRACT

An anticipatory speed-control system and method for generating a speed profile in real time by iteratively calculating proposed reduced speeds associated with an electronically identified target curve until the proposed speed is compliant with a lateral-acceleration-based comfort metric and a steering-angle-based safety metric and implementing the speed profile in accordance with a longitudinal comfort metric and providing a user with override options.

20 Claims, 4 Drawing Sheets

(56) References Cited

U.S. PATENT DOCUMENTS

| | | | |
|---|---|---|---|
| 2008/0078600 A1 | 4/2008 | Inoue et al. | |
| 2011/0102166 A1* | 5/2011 | Filev | B60W 30/02 340/435 |
| 2012/0203399 A1* | 8/2012 | Filev | B60W 30/02 701/1 |
| 2013/0110349 A1* | 5/2013 | Tseng | B60W 50/087 701/36 |
| 2014/0067226 A1 | 3/2014 | Lee et al. | |
| 2015/0151725 A1* | 6/2015 | Clarke | B60W 30/00 701/28 |

FOREIGN PATENT DOCUMENTS

| | | |
|---|---|---|
| WO | WO 2006/107267 A1 | 10/2006 |
| WO | WO 2008/059384 A2 | 5/2008 |

* cited by examiner

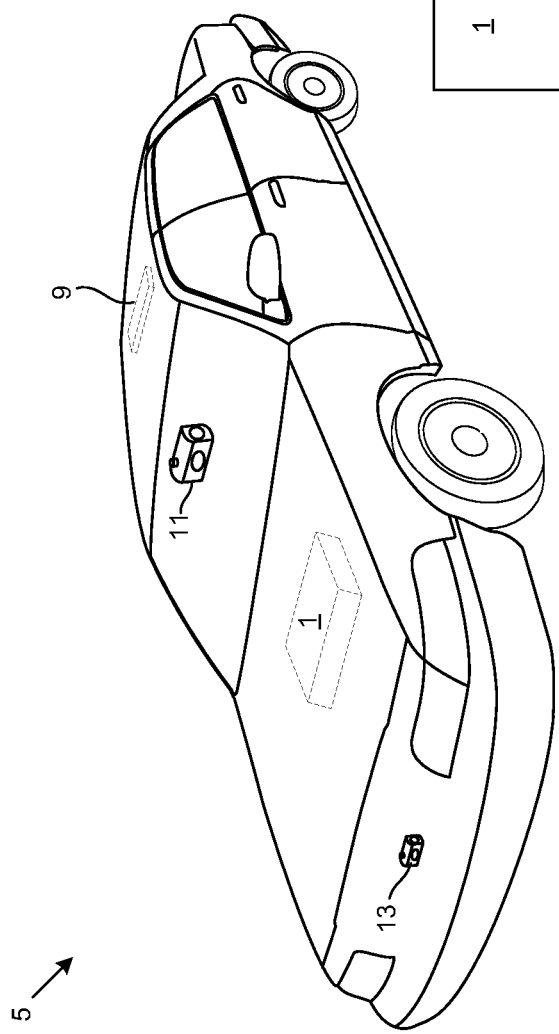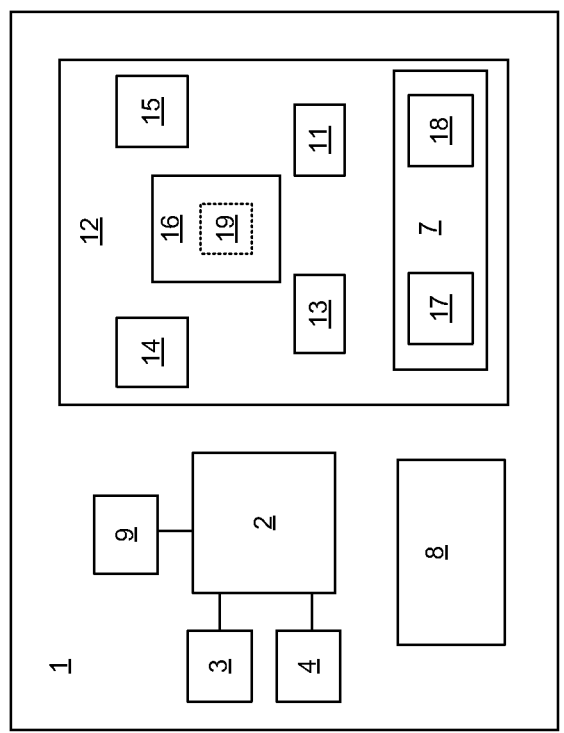

REAL-TIME ANTICIPATORY SPEED CONTROL

BACKGROUND

The present invention generally relates to anticipatory speed planning for vehicular cruise control, and specifically, relates to real-time, speed-profile generation responsive to changing road-attributes.

BRIEF DESCRIPTION OF THE DRAWINGS

The subject matter regarded as the invention is particularly pointed out and distinctly claimed in the concluding portion of the specification. The features and their interaction, operation, and advantages are best understood in view of the following detailed description and drawings in which:

FIG. 1 is a schematic, perspective view of a vehicle equipped with anticipatory speed-control, according to an example;

FIG. 2 is a schematic, block diagram of the anticipatory speed-control system, according to an example;

It will be appreciated that for the sake of clarity figure elements may not depicted to scale and analogous elements may share identical reference numerals.

DETAILED DESCRIPTION

Figure 3:
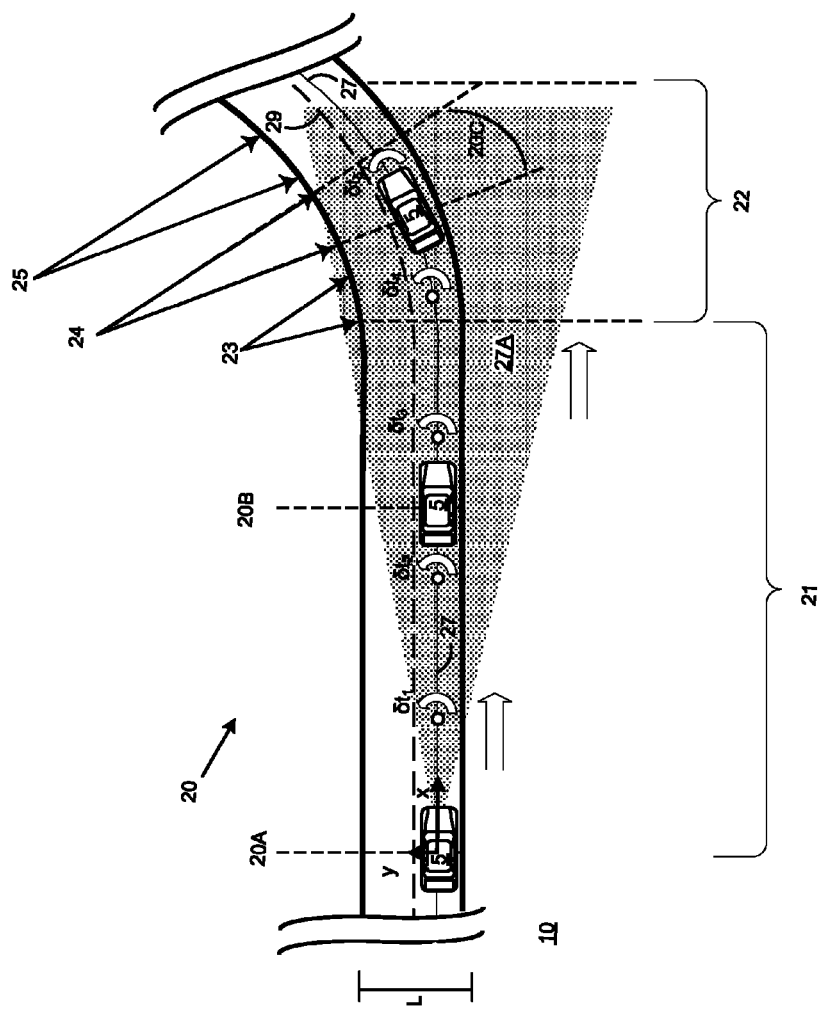
FIG. 3 is a schematic, top view of the vehicle of FIG. 1 during automatic deceleration in anticipation of an electronically detected upcoming curve, according to an example.

The following description includes details necessary to provide a thorough understanding of the invention and it should be understood that the examples may be practiced without these specific details. Furthermore, well-known methods, procedures, and components have been omitted in order to highlight features of the examples.

The present example generally relates to anticipatory speed-control for vehicular cruise control, and specifically, relates to real-time, speed-profile generation responsively to changing road-attributes as noted above.

The following terms will be used throughout the document.

"Road-attributes" refer to road related properties like, inter alia, curvature, slope, and bank angle.

"Vehicle parameters" refer to vehicle related properties like, inter alia, vehicle mass, vehicle inertia, distance spanning the center of gravity to each axle, plus front and rear cornering stiffness.

"Dynamic vehicle variables" refer to changing state variables like, inter alia, vehicle location, longitudinal and lateral speed, longitudinal and lateral acceleration, steering angle, change of steering angle, and angular heading.

"Curve" refers to a set of points having a substantially identical radius of curvature in a road segment, according to an example.

Turning now to FIGS. 1 and 2, FIG. is general schematic, perspective view of an automobile 5 equipped with anticipatory, speed-control system 1 operatively linked to one or more Global Positioning System (GPS) receivers 9, a forward-facing camera 11, an object detection sensor 13 for detection of upcoming objects and vehicles, according to an example.

FIG. 2 is a schematic, block diagram depicting components of anticipatory, speed-control system 1 of FIG. 1, according to an example.

Generally, anticipatory speed-control system 1 includes speed-profile generator 12 configured to process map data in conjunction with camera and object sensor data to generate a speed profile, location tracking unit 2 configured to identify vehicle location, and speed controller 8 configured to implement or initiate changes in speed in accordance with the speed profile though a linkage to the vehicle engine, according to an example.

Specifically, speed-profile generator 12 includes one or more processors or controllers 14, memory 15, long term non-transitory storage 16 containing a data base of map data 19, an object detection sensor 13, a forward-looking camera 11, Human Machine Interface (HMI) 7 having both input devices 17, and output devices 18, according to an example.

Processor 14 may be implemented, for example, as a central processing unit (CPU), a microchip, or a computing device of analogous functionality; all configured to execute code or instructions stored in memory 15 or long term storage 16.

Memory 15 may be implemented as Random Access Memory (RAM), read only memory (ROM), Dynamic RAM (DRAM), Synchronous DRAM (SD-RAM), double data rate (DDR) memory chip, flash or non-volatile memory, volatile memory, cache or buffer memory, or other suitable memory units or storage units Long term, non-transitory storage 16 may implemented as, for example, a hard disk drive, a floppy disk drive, a Compact Disk (CD) drive, a CD-Recordable (CD-R) drive, flash memory device. It should be appreciated that various combinations of the above memory and storage devices are also included within the scope of the present invention and that image data, code and other relevant data structures are stored in the above noted memory and/or storage devices.

Forward-facing camera or cameras 11 are configured to capture upcoming road geometry information either as multiple still images or as video or as a combination of both. In a certain example camera data is fused with map data 19 or GPS data or both when poor weather conditions diminish the reliability of camera data and sensor data from object sensor 13, as noted above. Various data fusion techniques may be employed as known to those skilled in the art. One such example is described in patent application publication US 20120290146 A1 and is included by reference here within in its entirety. Forward-looking camera 11 may be effective for augmenting such map data insufficiencies up to a rage of about 120 meter, according to an example.

A single object detection sensor or a plurality of such sensors 13 are configured to detect vehicles and object ahead of the vehicle 5 and may be implemented as inter alia, radar, Light Detection and Ranging (LIDAR), Inertial Measurement Unit (IMU) or various combinations of them. Forward camera data may be fused with object sensor data for improved accuracy in object detection, according to an example. Furthermore, IMU data may combined relative motion data provide by object detection sensor 13 to obtain absolute motion data of an object.

Input devices 17 include, inter alia, microphones, touch screens, keypads, video cameras and output devices include 18, inter alia, monitor, lights, speakers, and haptic devices and various combinations thereof.

Location tracking unit 2 is configured to track vehicle location either on the basis of GPS data obtained from GPS receiver 9 or dead reckoning employing speed and mileage data from the speedometer 3 and odometer 4, according to an example.

FIG. 3 is a schematic, top view of automobile or vehicle 5 traveling in road lane 20 having straight and curved segments, 21 and 22 respectively. As shown, a coordinate system relative to the center of gravity of vehicle 5 (vehicle-centered coordinated system) is employed such that the longitudinal direction is designated as the "x" axis and the lateral direction is designated as the "y" axis, according to an example. Curved segment 22 includes multiple segments; each having a different radius of curvature 23, 24, and 25. Location 20A is a location in which analysis of upcoming curved segment 22 is initiated in search of maximum curvature 24 among its multiple radii 23, 24, and 25, for example. The entry point into the set of points of maximum curvature 24 is the point in a travel path for which the predicted lateral acceleration is to be used as a first comfort metric for establishing a speed profile and vehicular handling metrics like steering angle and steering angle change, as will be further discussed Depicted is a preliminary travel path 29 associated with the lane center identified from the map data and identified maximum curvature at point 24. Forward facing camera 11 (Shown in FIG. 1) has a field of vision 27A in which ascertain upcoming road attributes are used to either augment or to modify preliminary travel path 29 obtained from the map data as will be further discussed.

Vehicle-centered travel path 27 is defined by steering curvatures $\delta t_1$-$\delta t_5$ in accordance with object sensor and camera data used to modify travel path 29 as will be further discussed.

In a certain example, road attributes of upcoming road segments are checked at a distance ranging between 200 meters to 400 meters in advance, for speeds up to about 90 m.p.h., according to an example.

Figure 4:
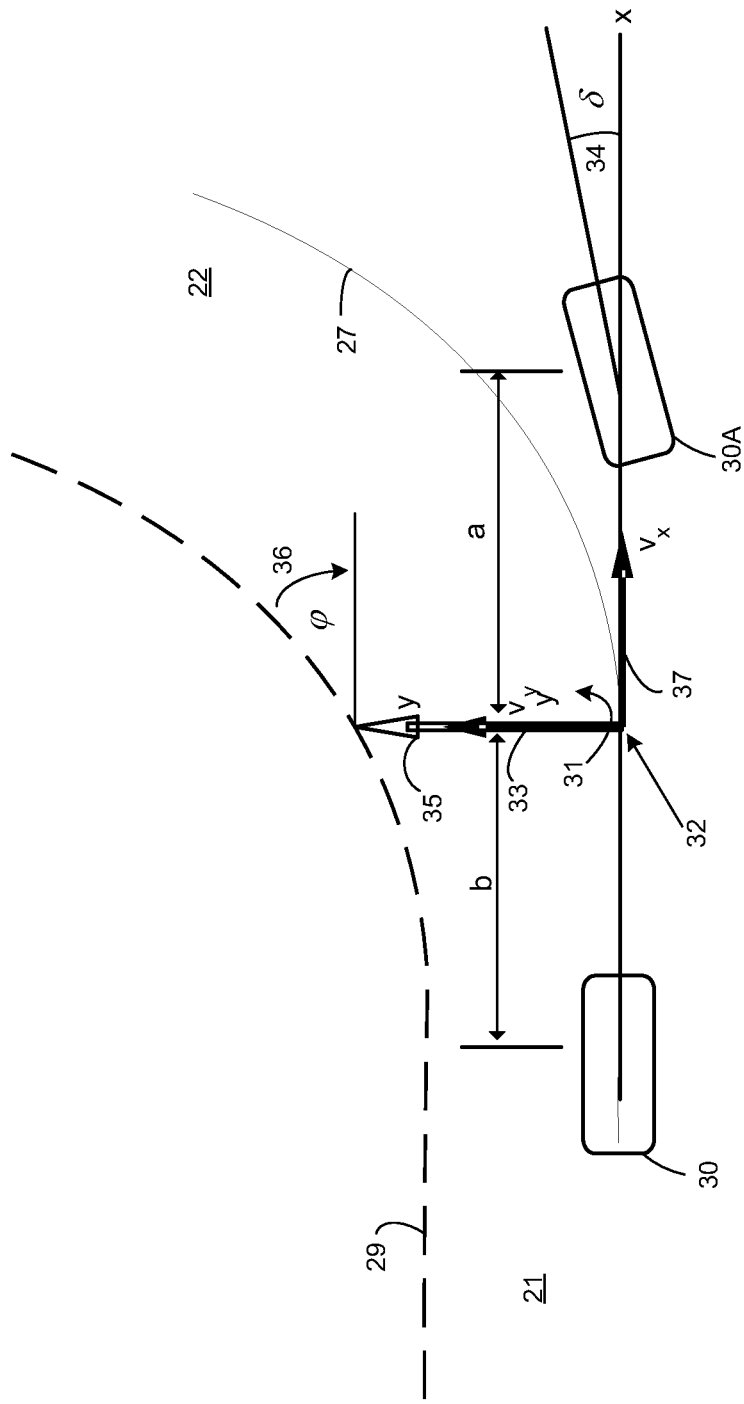
FIG. 4 is a vector diagram of the vehicle of FIG. 1 negotiating the curve of FIG. 3, according to an example.

FIG. 4 is a vector diagram of vehicle of vehicle 10 negotiating curve segment 22 of lane during travel along vehicle-centered path 27, according to an example. Depicted are front and rear tires 30 disposed at longitudinal distances "a" and "b" from center of gravity 32 of the vehicle, respectively, lateral distance "y" 35 from the lane center 29, vehicle heading angle "y" 36, vehicle lateral speed "$v_y$" 33, vehicle longitudinal speed "$v_x$" 37 yaw rate "w" 31, and steering angle "$\delta$" 34, according to an example.

Figure 5:
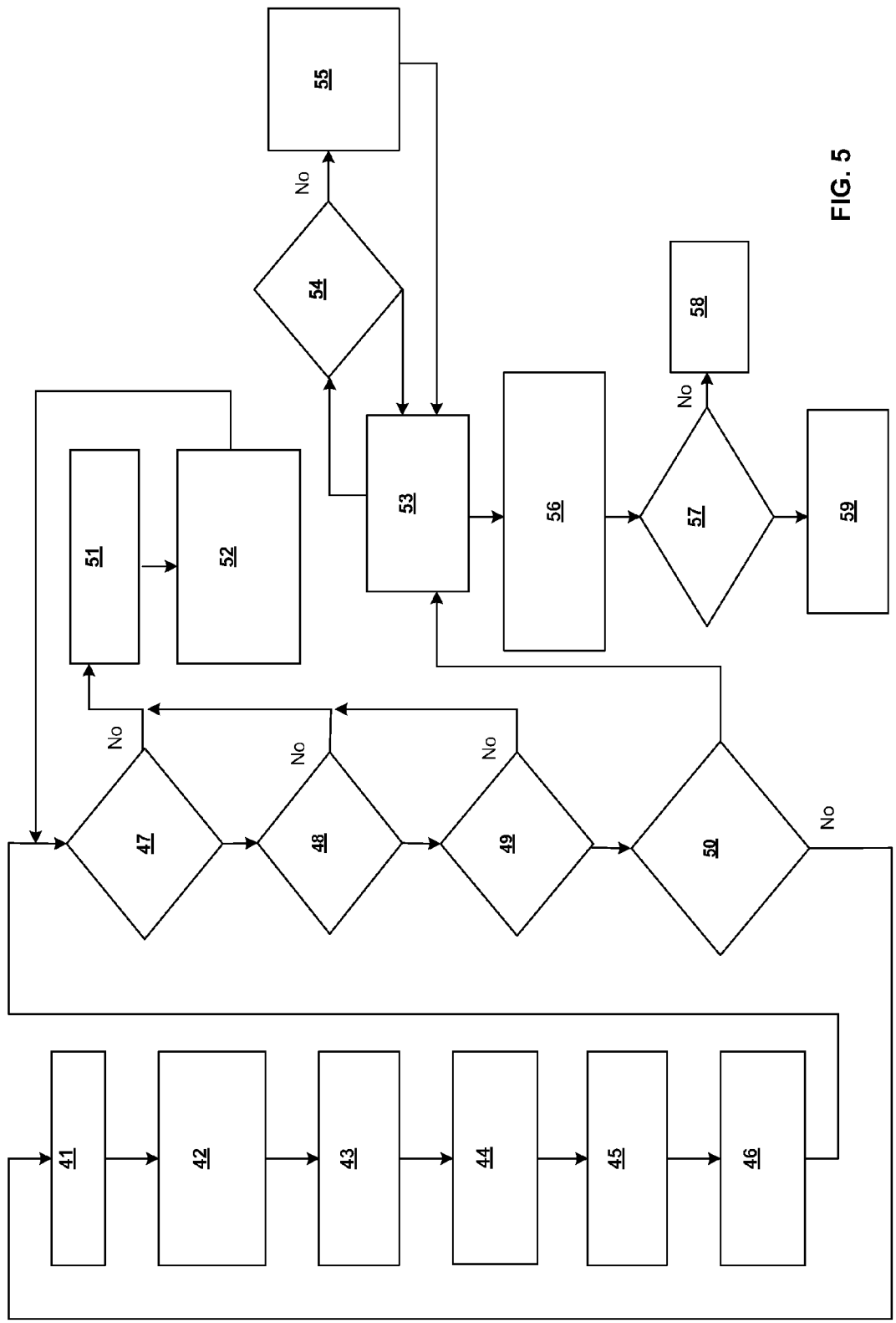
FIG. 5 is a flowchart depicting the operational steps involved in anticipatory speed-control, according to an example.

FIG. 5 is a flow diagram depicting steps employed to generate a speed profile calculated for each future time increment spanning the expected travel time from vehicle location 20A to target curve 24 and will be described in view of FIGS. 1-4, according to an example.

At processing step 41, anticipatory speed-control 12 scans map database 19 during travel and identifies an upcoming target or destination curve having the greatest radius of curvature from among curvatures of radii, 23, 24, and 25, as noted above. Alternatively, the maximum curvature 24 can be identified from forward-facing camera 11 or road profile data received by GPS receiver 9, and object sensor 13 or a combination of them, as is known to those skilled in the art.

Suitable map data is available at NAVTEQ Corporation; 425 West Randolph Street; Chicago, Ill. 60606 USA; and online at http://corporate.navteq.com/products_data_whatis.htm. Additional map suppliers include Google Map, Microsoft Map, Open Street Map, Garmin, and Magellan.

In step 42, lane-centered travel path 29 is identified on the basis of identified target curve 24.

At processing step 43, an off-center, Vehicle-Centered Travel Path (VCP) 27 is identified using data supplied from forward-facing camera 11. System 1 is configured to assume a driver will steer the travel to lane-centered travel path 29 in accordance with the following path equation:

$$y_n(x_n) = a_0 + a_1 x_n + a_2 x_n^2 + a_3 x_n^3 + a_4 x_n^4 + a_5 x_n^5$$

$$0 \le x_n = \frac{x}{v_x \Delta T} \le 1,$$

$$y_n = \frac{y}{L}$$

wherein "$\Delta T$" is the time period within which VCP path 27 merges with lane-centered travel path 29 and "L" is the lane width. "$\Delta T$" may be determined from lateral "$v_y$" as calculated below. From this determined $\Delta T$ and road geometry information captured by forward-facing camera 11, coefficients $a_0$ through $a_5$ may be calculated from known positions "x" and "y" in accordance with the following example matrix equation:

$$\begin{bmatrix} a_0 \\ a_1 \\ a_2 \\ a_3 \\ a_4 \\ a_5 \end{bmatrix} = \begin{bmatrix} 1 & x(0) & x^2 & x^3(0) & x^4(0) & x^5(0) \\ 0 & 1 & 2x(0) & 3x^2(0) & 4x^3(0) & 5x^4(0) \\ 0 & 0 & 2 & 6x(0) & 12x^2(0) & 20x^3(0) \\ 1 & x(t_{\Delta T}) & x^2(t_{\Delta T}) & x^3(t_{\Delta T}) & x^4(t_{\Delta T}) & x^5(t_{\Delta T}) \\ 0 & 1 & 2x(t_{\Delta T}) & 4x^3(t_{\Delta T}) & 4x^3(t_{\Delta T}) & 5x^4(t_{\Delta T}) \\ 0 & 0 & 0 & 6x(t_{\Delta T}) & 12x^2(t_{\Delta T}) & 20x^3(t_{\Delta T}) \end{bmatrix}^{-1} \begin{bmatrix} y(x(0)) \\ y'(x(0)) \\ y''(x(0)) \\ y(x(t_{\Delta T})) \\ y'(x(t_{\Delta T})) \\ y''(x(t_{\Delta T})) \end{bmatrix}$$

Further explanation of calculations relating to the above path equation is found in US Patent application publication 2009/0319,113 and is incorporated by reference here within in its entirety.

At processing step 44 predicted vehicle motion variables $v_x$, $v_y$, w, $a_y$, and $\dot{w}$ are calculated from the path equation noted above.

In the first iteration, system 1 checks the current speedometer value for compliance with safety and comfort metric limitations and if non-compliant, iteratively calculates proposed reduced speeds until a compliant speed is discovered.

As noted $v_x$ is first assumed to be a constant value speed throughout travel time to the target curve decomposed from a speedometer. Corresponding vehicle motion variables are calculated in accordance with:

$v_y = \dot{y} - v_x \phi$, where $\dot{y} = dy/dt = y' v_x$, and from the desired path $y' = 5a_5 x^4 + 4a_4 x^3 + 3a_3 x^2 + 2a_2 x + a_1$ $\dot{v}_y = a_y = \ddot{y} = d^2y/dt^2 = y'' v_x^2 + y' a$, where $$y''' = 20a_5x^3 + 12a_4x^2 + 6a_3x + 2a_2w = d(y')/dt = y''v_x;$$

$$\dot{w} = d(w)/dt = y'''v_x + y''v_x^2,$$

wherein $\dot{y}$ is a time derivative of lateral displacement from the x-axis, and $y' = dy/dx$, according to an example.

At processing step 45, predicted steering angle "$\delta_{pred}$" and a corresponding change steering angle "$\Delta\delta$" are calculated from the values of vehicle motion variables $v_x$, $v_y$, w, $a_y$, and $\dot{w}$ determined for the previous time interval in accordance with:

$$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2C_f + b^2C_r}{Iv_x} \end{bmatrix} \cdot$$

$$\begin{bmatrix} v_y \\ w \end{bmatrix} + \begin{bmatrix} \dfrac{C_f}{m} \\ \dfrac{aC_f}{I} \end{bmatrix} \cdot \delta_{pred} + \begin{bmatrix} -g \\ 0 \end{bmatrix} \cdot \theta_{bank}$$

Wherein "g" is the gravitational acceleration constant.
"$\theta_{bank}$" is a bank angle relative to the horizontal.
"I" is vehicle inertia and is a known vehicle parameter.
"m" is vehicle mass and is a known vehicle parameter.
"a" and "b" are distances between the vehicle center of gravity and
front and rear axle, respectively and are known vehicle parameters.
"$C_f$" and "$C_r$" are front and rear cornering stiffness factors and are known vehicle parameters.

The change steering angle "$\Delta\delta$" for each predicted steering angle "$\delta_{pred}$" at each is simply the difference between the predicted steering angle and its previous value at the prior time increment, according to an embodiment.

In processing step 46, lateral acceleration "$a_{y,\,predicted}$" is calculated in accordance with the above motion equation.

As noted, these calculations are reiterated throughout the calculated travel time to target curve 24 at time increments of 0.1 second increments, according to an example. It should be appreciated that other time increments providing the necessary system functionality may also be employed. Travel time to target curve 24 is determined from distance data or received from the data map in conjunction with speedometer or from GPS speed data or a combination of them.

At processing step 47 the predicted steering angle $\delta_{pred}$ is compared to safety limit $\delta_{limit}$ and if the comparison indicates that the predicted steering curve $\delta_{pred}$ is less than the safety limit processing continues at step 48. Steering angle limit is a speed dependent value that differs for each vehicle and is obtained from a look up table, according to an example.

At processing step 48 the predicted change in steering angle $\Delta\delta_{pred}$ is compared to safety limit $\Delta\delta_{limit}$ and if the comparison indicates that the predicted change in steering curve $\Delta\delta_{pred}$ is less than the safety limit, processing continues at step 49. Safety limit $\Delta\delta_{limit}$ is also a speed dependent value that differs for each vehicle and is obtained from a look up table, according to an example.

At processing step 49 the absolute value of the updated lateral acceleration $a_{y,\,predicted}$ is comp compared to safety limit $a_{y,\,limit}$ and if the comparison indicates that the predicted lateral acceleration is within the safety limits, no corrective is performed and system 1 continues to monitor road conditions, according to an example.

However, if any of the above comparisons at steps 47, 48, and 49 indicate that either the predicted steering angle $\delta_{pred}$, or change in steering angle $\Delta\delta_{pred}$, or lateral acceleration $a_{y,\,predicted}$ exceeds its respective limit value, processing continues to step 50 where each parameter in excess of its threshold is assigned its respective limit value and a corresponding value horizontal velocity $v_x$ at the current location of the vehicle is calculated in accordance with the above-noted dynamics equation.

At processing step 50, an evaluation is made in regards to the conditions satisfied in steps 47-49 relating to a reduced speed or not. If they do not relate to a reduced speed, processing continues to step 41 where system 1 continues to scan map data 19 and camera data or the combination of them for upcoming changes in road geometry. If it is determined that conditions satisfied in steps 47-49 relate to a reduced speed, processing continues to step 53.

At processing step 53, deceleration location 20B is identified on the basis of the proposed velocity now designated as target speed "$v_{des\_curve}$" and a longitudinal acceleration limit "$a_{x,\,lim}$" ranging between about 0.12 g~0.15 g, according to an example.

A deceleration distance "$s_{dest\_curve}$" spanning the destination curve 24 to deceleration location 20B is obtained from the equation:

$$s_{curve} = (v_{curve}^2 - v_x^2)/(2a_{x,lim})$$

Wherein "$v_{curve}$" is the target speed into destination curve, 24 as noted, and "$v_x$" is the current longitudinal velocity, according to an example. It should be noted that "$v_x$" may be resolved from the proposed velocity or the proposed velocity may be implemented as a longitudinal velocity.

System 1 initiates deceleration location 20B distance of $S_{curve}$ from tightest target curve 24 at a rate of "$a_{x,lim}$". In a certain example, a deceleration rate is implemented less than "$a_{x,\,lim}$".

Similarly, system 1 is also configured to initiate comfortable deceleration at an identified deceleration location ensuring vehicle travel speed is compliant with an upcoming speed limit change. The road speed limit "$v_{spd\_limit}$" is obtained from map database 19 and the distance to the new speed limit "$s_{des\_autoset}$" s is calculated in accordance with:

$$s_{des\_autoset} = \frac{v_{spd_{limit}}^2 - v_x^2}{2a_{x,lim}}$$

When vehicle 5 is within distances "$s_{des\_autoset}$" from new speed limit "$v_{spd\_limit}$" the speed control system 1 initiates deceleration at a rate of "$a_{x,lim}$".

Vehicle location data needed to initiate deceleration at deceleration location 20B is obtained from location tracking unit 2.

At step 54, location tracking unit 2 evaluates if available GPS data is sufficient to identify deceleration location 20B in reference to the current position of vehicle 1. If not processing continues to step 55 where a dead reckoning algorithm is employed as will be further discussed.

In step 56, HMI 7 of anticipatory speed-control system 1 informs a driver of a proposed deceleration scheduled to begin at deceleration location 20B, according to an example and prompts the driver to indicate that interested in cancelling the scheduled deceleration. The form of the output and input is implemented through any one or combination of modalities; visually, audibly, and haptically.

In step 57, an absence of a use response is presumed to be a tacit approval and speed controller 8 proceeds to initiate the safety oriented deceleration as depicted in step 58. If driver feedback is received, the planned deceleration is cancelled as shown in step 59, according to an example. The feedback may also be provided in any one or combination of modalities; verbal, visual, or tactile in accordance with the input devices employed. It should be appreciated that examples having deceleration implemented only upon receipt of user confirmation is also included within the scope of the present invention.

As noted above, when GPS data is unavailable or inadequate, location tracking unit 8 employs deed reckoning to generate current location data, according to an example.

In a certain example, the dead reckoning is implemented in conjunction with a Kalman filter to improve accuracy and reliability of the location data to identify deceleration location 20A.

The deed reckoning algorithm uses vehicle odometer and speedometer state data with the last known GPS vehicle position in accordance with the following state equations:

Travelled distance $s_m(k)$ represents distance travelled as measured by the odometer and $v_m$ represents speed as measured by the speedometer.

Longitudinal position vector is given by:

$$x(k+1)=A \times (k)+Bu(k)+w(k)$$

Lateral position vector is given by:

$$y(k)=H \times (k)+v(k)$$

Wherein "k" is the time variable such that the longitudinal position is given by:

$x(k)=[s(k)\dot{s}(k)]^T$, and lateral position is given by:

$x(k)=[s_m(k)]^T$, and lateral position is given by:

$$y(k)=[s_m(k)v_m(k)]^T$$

wherein $u(k)=a(k)$, vehicular acceleration and $w(k)$ and $v(k)$ are process noise and sensor noise, respectively. Their noise characteristics are $w(k) \sim N(0, Q)$, $v(k) \sim N(0,R)$ wherein N represents a normal distribution, and Q and R are the noise variance and $s(k)$ and $\dot{s}(k)$ represent internal state variables.

$$A = \begin{bmatrix} 1 & \Delta t \\ 0 & 1 \end{bmatrix},$$

$$B = \begin{bmatrix} 1 \\ 2\Delta t^2 \\ \Delta t \end{bmatrix},$$

$$H = \begin{bmatrix} \gamma(k) & 0 \\ 0 & 1 \end{bmatrix}$$

Wherein $$\gamma(k) = \begin{cases} 1, & \text{if } k = iN \\ 0, & \text{if } k \neq iN \end{cases}, \text{ and } N = \frac{\Delta T}{\Delta t}$$

$\Delta t$ refers to speedometer update rate, like every 20.0 milliseconds, and $\Delta T$ refers to GPS update rate like every 1.0 second.

$x(k)=[s(k) \; \dot{s}(k)]^T$ is predicted over time as $\hat{x}^-(k+1)$ with the following equations.

Kalman filter time (prediction) update $$\hat{x}^-(k+1)=A\hat{x}^+(k)+Bu(k)$$

$$P^-(k+1)=AP^+(k)A^T+Q$$

Kalman filter measurement (correction) update $$K(k+1)=P^-(k+1)H^T(k+1)[H(k+1)P^-(k+1)H^T(k+1)+R]^{-1}$$

$$\hat{x}^+(k+1)=\hat{x}^-(k+1)+K(k+1)[y(k+1)-H(k+1)\hat{x}^-(k+1)]$$

$$P^+(k+1)=[I-K(k+1)H(k+1)]P^-(k+1)$$

Such that $\hat{x}^-(k+1)$ is the estimated distance immediately preceding the target point and is calculated entirely on the basis of vehicle odometer and the speed sensor data without GPS input.

The above disclosed algorithm advantageously eliminates heavy off-line computation and large memory normally required for neural network table storage or off-line machine learning computation for look up table generation.

It should be appreciated that non-explicit combinations of features set forth in different embodiments are also included within the scope of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An anticipatory speed-control system for a vehicle with front and rear axles, the anticipatory speed-control system comprising:
    a vehicular speed-profile generator configured to generate a speed profile in accordance with predicted lateral acceleration of a target curve identified at least partly from map data; and
    a speed controller configured to actuate vehicle deceleration in accordance with the speed profile,
    wherein the predicted lateral acceleration is calculated in accordance with $$\begin{bmatrix} \dot{v}_y \\ \dot{w} \end{bmatrix} = \begin{bmatrix} -\frac{C_f + C_r}{mv_x} & \frac{bC_r - aC_f}{mv_x} - v_x \\ \frac{bC_r - aC_f}{Iv_x} & \frac{a^2C_f + b^2C_r}{Iv_x} \end{bmatrix} \cdot \begin{bmatrix} v_y \\ w \end{bmatrix} + \begin{bmatrix} \frac{C_f}{m} \\ \frac{aC_f}{I} \end{bmatrix} \cdot \delta_{pred} + \begin{bmatrix} -g \\ 0 \end{bmatrix} \cdot \theta_{bank}$$

wherein $\dot{v}_y$ is the predicted lateral acceleration, g is a gravitational acceleration constant, a and b are distances between a vehicle center of gravity and the front axle and the rear axle, respectively, $\delta_{pred}$ is a predicted steering angle, $\dot{w}$ and w are predicted vehicle motion variables, $v_y$ is a vehicle lateral speed, $v_x$ is a vehicle longitudinal speed, m is a vehicle mass, I is a vehicle inertia, $C_f$ and $C_r$ are a vehicle front and a vehicle rear cornering stiffness, respectively, and $\theta_{bank}$ is a bank angle.

2. The anticipatory speed-control system of claim 1, wherein the vehicular speed-profile generator is further configured to generate the speed profile in accordance with predicted lateral acceleration at the target curve.

3. The anticipatory speed-control system of claim 2, wherein the vehicular speed-profile generator is further configured to generate the speed profile in accordance with a change in steering angle.

4. The anticipatory speed-control system of claim 1, wherein the vehicular speed-profile generator is further configured to model a travel path as a Vehicle Centered Path (VCP) in accordance with a 5th order polynomial equation.

5. The anticipatory speed-control system of claim 2, wherein the speed-profile generator is further configured to calculate a deceleration location "$s_{curve}$" in accordance with "$s_{curve}$"=$(v_{x,pred}^2 - v_{x,current}^2)/2a_{x,lim}$, wherein "$s_{curve}$" is a distance spanning a current vehicle location and the target curve, "$a_{x,lim}$" is a longitudinal deceleration limit, "$v_{x,pred}$" is a predicted longitudinal velocity, and "$v_{x,current}^2$" is a current longitudinal velocity.

6. The anticipatory speed-control system of claim 1, wherein the speed-profile generator includes a position-tracking unit that includes a Global Positioning System (GPS) receiver.

7. The anticipatory speed-control system of claim 5, wherein the position: tracking unit is configured to track the vehicle position in accordance with a dead reckoning algorithm responsively to a loss of a GPS signal, the dead reckoning algorithm including Kalman filtering.

8. The anticipatory speed-control system of claim 1, further comprising a Human Machine Interface (HMI) configured to inform a driver of a planned deceleration.

9. The anticipatory speed-control system of claim 8, wherein the HMI is further configured to prompt the driver to override the planned deceleration.

10. A method for anticipatory speed-control for a vehicle with front and rear axles, the method comprising:
providing a vehicular speed-profile generator including a processor configured to generate a speed profile in accordance with predicted lateral acceleration of a target curve identified at least partly from map data; and
providing a speed controller in communication with the vehicular speed-profile generator and configured to responsively decelerate the vehicle in accordance with the speed profile generated by the vehicular speed-profile generator,
wherein the predicted lateral acceleration is calculated in accordance with $$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2 C_f + b^2 C_r}{Iv_x} \end{bmatrix} \begin{bmatrix} v_y \\ w \end{bmatrix} + \begin{bmatrix} \dfrac{C_f}{m} \\ \dfrac{aC_f}{I} \end{bmatrix} \cdot \delta_{pred} + \begin{bmatrix} -g \\ 0 \end{bmatrix} \cdot \theta_{bank}$$

wherein $\dot{v}_y$ is the predicted lateral acceleration, g is a gravitational acceleration constant, a and b are distances between a vehicle center of gravity and the front axle and the rear axle, respectively, $\delta_{pred}$ is a predicted steering angle, $\dot{w}$ and w are predicted vehicle motion variables, $v_y$ is a vehicle lateral speed, $v_x$ is a vehicle longitudinal speed, m is a vehicle mass, I is a vehicle inertia, $C_f$ and $C_r$ are a vehicle front and a vehicle rear cornering stiffness, respectively, and $\theta_{bank}$ is a bank angle.

11. The method of claim 10, wherein the speed-profile generator is further configured to calculate a deceleration location "$s_{curve}$" in accordance with "$s_{curve}$"=$(v_{x,pred}^2 - v_{x,current}^2)/2a_{x,lim}$, wherein "$s_{curve}$" is a distance spanning a current vehicle location and the target curve and "$a_{x,lim}$" is a longitudinal deceleration limit, "$v_{x,pred}$" is a predicted longitudinal velocity, and "$v_{x,current}^2$" is a current longitudinal velocity.

12. The method of claim 11, wherein the longitudinal deceleration limit "$a_{x,lim}$" is implemented at a value less than or equal to 0.15 g.

13. The method of claim 10, wherein the vehicular speed-profile generator is further configured to generate the speed profile in accordance with predicted steering angle associated with the target curve.

14. The method of claim 13, wherein the vehicular speed-profile generator is further configured to generate the speed profile in accordance with a predicted change in the steering angle associated with the target curve.

15. The method of claim 14, wherein the speed-profile generator includes a position-tracking unit configured to track vehicle position.

16. The method of claim 15, wherein the position-tracking unit includes a Global Positioning System (GPS) receiver.

17. The method of claim 15, wherein the position-tracking unit is configured to track the vehicle position in accordance with a dead reckoning algorithm responsively to a loss of a GPS signal, the dead reckoning algorithm including Kalman filtering.

18. The method of claim 10, further comprising informing a driver of a proposed deceleration.

19. The method of claim 10, further comprising providing a prompt requesting driver override of the proposed deceleration.

20. The method of claim 18, further comprising providing a prompt requesting driver override of the proposed deceleration.

* * * * *